P. Voorhis
Obstructing Ice in Rivers and Harbors.
N°. 63,968. Patented Apr. 16, 1867.
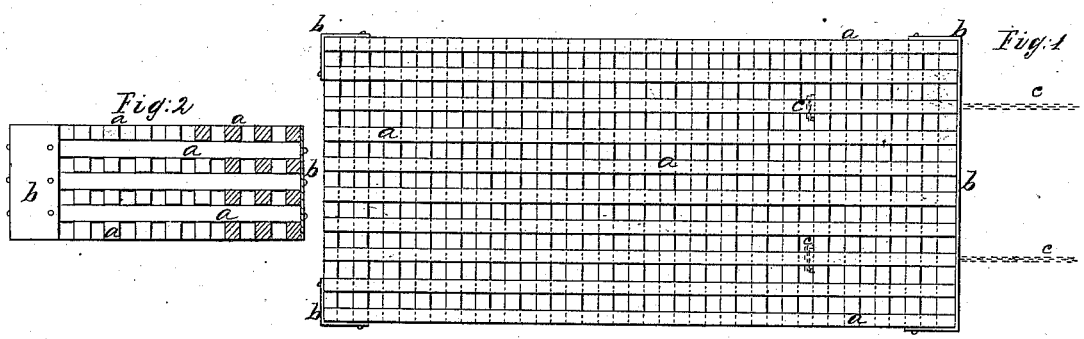
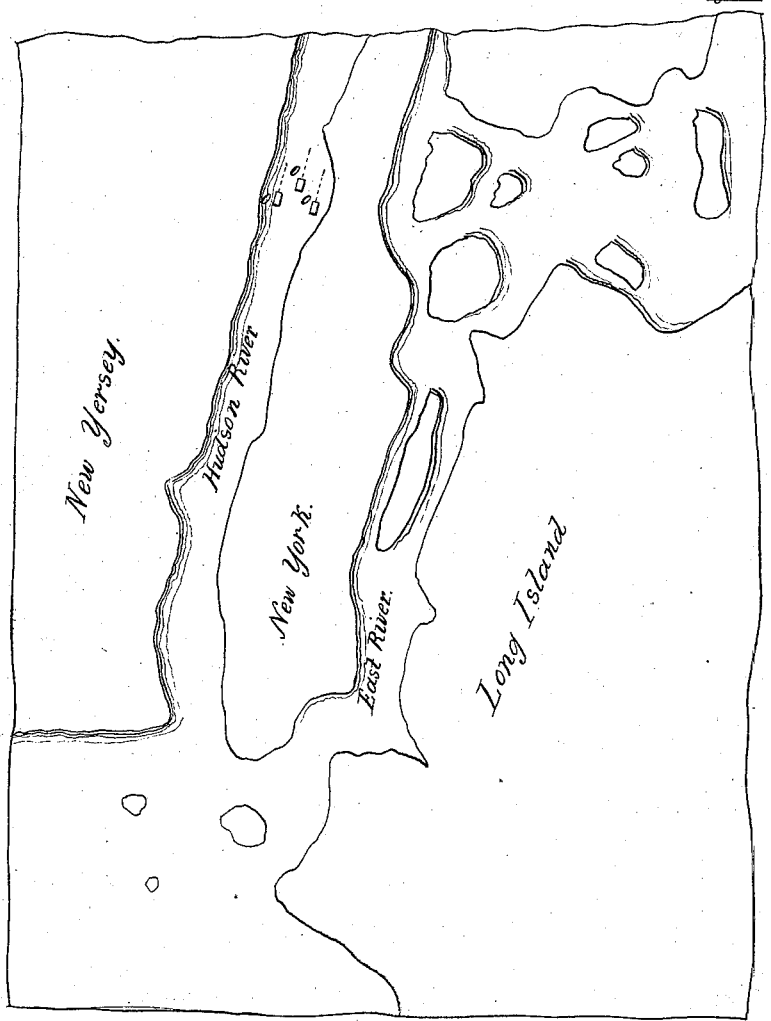
Witnesses
Charles Speer
John McGuire
Inventor
Peter Voorhis
By atty J. A. McIntire

United States Patent Office.

PETER VOORHIS, OF NEW YORK, N. Y.

Letters Patent No. 63,968, dated April 16, 1867.

IMPROVED METHOD OF OBSTRUCTING ICE IN RIVERS AND HARBORS.

The Schedule referred to in these Letters Patent and making part of the same.

TO ALL WHOM IT MAY CONCERN:

Be it known that I, PETER VOORHIS, of New York, of New York county, in the State of New York, have invented a new Method of Preventing the Choking up of Harbors, Ferry Slips, etc., with Ice; and I do hereby declare that the following is a full and exact description thereof, reference being had to the accompanying drawings, making part of this application.

My invention relates to a novel method or means of preventing the choking up of and obstruction in harbors, etc., by the accumulation of floating ice; and has for its objects to prevent the floating of ice, by the tides, into harbors adjacent to and connected with rivers or streams in which the ice is made or formed; and also to prevent the accumulation of loose ice around ferry-slips, bridges, etc. And to these ends my invention consists in the employment of floating, anchored, ice obstructors, suitably constructed, and so arranged as to detain and hold bodies of floating ice, and induce to an effectual stop or ice dam, as will be hereinafter more fully explained.

To enable those skilled in the art to more fully comprehend my invention, I will proceed to describe it more in detail, referring to the accompanying drawings, in which—

Figures 1 and 2, plate 1, are a top view and a sectional elevation of an ice obstructor such as I propose to use.

Plate 2 is a diagram illustrating New York harbor and the application thereto of my new method or system of ice obstruction The ice obstructor or breaker I propose to make, as shown, in the form of a very strong and durable raft or framework of timbers clad with iron, as seen at figs. 1 and 2, plate 1; $a\ a$ being the timbers, and $b\ b$ the iron armor. These frames are to be floated to any desired place, and are to be provided with suitable chain cables, $c\ c$, to which are secured anchors sufficiently heavy to insure the permanency of the frame or raft against any pressure which may be brought against it.

I will explain my new method as applied to the harbor of New York, illustrated at plate 2: I have found, by long observation, and from my experience in and knowledge of the tides and winds, that nearly, if not quite, all the ice which chokes up the East river (and which causes some seasons, by the interruption of travel between New York and Brooklyn, damage to boats, wharves, etc., immense losses) is made or formed up the Hudson river, and, after "breaking up" there, is carried, by the tides, down the Hudson and around into the East river, the difference between the times of the tides in these two rivers being such as to induce to this result. To avoid this great evil I propose to place in the Hudson river, say at about "Fort Washington point," (or wherever the river is apt to freeze out pretty well,) a series of my ice obstructors, as shown at $o\ o\ o$, plate 2, and there securely anchor them, in such positions as to form, together with the projections of the shores, such an impediment to bodies of ice that they will clog up at this point and effectually freeze or close over the river, and thus keep the lower portion of the river and the harbor entirely free of ice (until the ice shall have become so thin and rotten that its exit from the river can cause no damage or serious obstruction to navigation.) I also propose, wherever it may be expedient, to protect ferry-slips and wharves from being choked up and damaged by ice, by forming or effecting, at a proper locality near the slip or wharf, a blockade or dam of ice, clogging up the masses of ice with one or more of my ice obstructors, as before explained.

It will be understood that the frames or rafts described are readily to be removed or shifted from one place to another, as desired, and may be anchored wherever they may be needed.

It will be seen that by the employment of a framework or raft, such as shown and described, the ice obstructor or breaker cannot be so damaged by the ice as to be rendered less effective or have its usefulness impaired, as might be the case were a boat or vessel of any kind employed, the effectiveness of which could be destroyed by its becoming fractured or broken in.

I propose, under some circumstances, to make the ice obstructor or breaker of such a form, at that end or portion which is placed so as to catch the moving ice, that it will allow the cakes or bodies of ice to ride partially on to it and effect the "breaking up" of the latter. Of course the details of construction of the frame or raft, its armor, the means of anchoring it, etc., may be varied at the will of the engineer and to suit the circumstances under which my invention is to be carried out; the gist of my invention resting in the idea of the use of floating anchored frame or frames, so constructed and arranged at the proper locality as to effect the objects above alluded to.

It will be understood that an obstructor, such as shown and described, will be exceedingly durable, and, if (when not in use) it be floated off into fresh water during the warmer seasons, will last for a long time. It will be understood, also, that the form and conditions of the armor or metallic plating may be varied to suit varying circumstances. I have deemed it essential to show and describe only one simple form of iron-clad raft.

Having explained the objects and operation of my new method and means of blockading ice, to prevent obstruction in and damage to harbors, slips, bridges, wharves, etc., what I claim as new, and desire to secure by Letters Patent, is—

The combination of floating iron-clad "obstructors" with anchors, arranged to operate substantially in the manner and for the purposes hereinbefore described.

In testimony whereof I have hereunto set my hand and seal this 9th day of February, 1867.

PETER VOORHIS. [L. S.]

Witnesses:
    J. MAC INTIRE,
    CHARLES SPEER.